(12) United States Patent
Nishizawa et al.

(10) Patent No.: US 8,032,554 B2
(45) Date of Patent: Oct. 4, 2011

(54) STREAM DATA PROCESSING METHOD AND SYSTEM

(75) Inventors: Itaru Nishizawa, Koganei (JP);
Tsuneyuki Imaki, Kawasaki (JP);
Masanori Kawashima, Yokohama (JP);
Atsuro Handa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 236 days.

(21) Appl. No.: 12/537,676

(22) Filed: Aug. 7, 2009

(65) Prior Publication Data

US 2010/0106710 A1  Apr. 29, 2010

(30) Foreign Application Priority Data

Oct. 28, 2008 (JP) ................................. 2008-276977

(51) Int. Cl.
*G06F 17/30* (2006.01)
(52) U.S. Cl. ........................................ 707/781; 715/781
(58) Field of Classification Search .................. 707/722, 707/725; 715/781, 783
See application file for complete search history.

(56) References Cited

U.S. PATENT DOCUMENTS

| 7,403,959 | B2 | 7/2008 | Nishizawa et al. | |
| 7,673,065 | B2 * | 3/2010 | Srinivasan et al. | ............ 709/231 |
| 2007/0226239 | A1 | 9/2007 | Johnson et al. | |
| 2008/0255847 | A1 * | 10/2008 | Moriwaki et al. | ......... 704/270.1 |
| 2009/0313614 | A1 * | 12/2009 | Andrade et al. | .............. 717/151 |

FOREIGN PATENT DOCUMENTS

JP  2006-338432 A  12/2006

OTHER PUBLICATIONS

R. Motwani et al., Query Processing, Resource Management, and Approximation in a Data Stream management System, Proceedings of the 2003 CIDR Conference.
C.J. Date et al., A Guide to the SQL Standard, 4th Edition, Addison-Wesley, pp. 9-26.
R. Motwani et al., Caching Queues in Memory Buffers, In Proc. of SODA 2004, pp. 541-549.
A. Arasu et al., The CQL continuous query language: semantic foundations and query execution, The VLDB Journal, vol. 15, Issue 2, Jun. 2006, pp. 121-142.

* cited by examiner

*Primary Examiner* — Cheryl Lewis
(74) *Attorney, Agent, or Firm* — Mattingly & Malur, PC

(57) ABSTRACT

Stream data is provided for realizing precise calculation processing to keep a constant memory usage of a query including a time-based window, and to take all of input data into consideration. A stream data processing server sections the time-based window into sub-windows each with a smaller width by a query time resolution change unit, and a query processing engine executes the aggregation processing based on the sub-window when receiving the stream data to generate an aggregation tuple, and calculates the calculation result of the query including the time-based window by aggregation processing on the aggregation tuple.

15 Claims, 12 Drawing Sheets

```
register query Q1
RSTREAM [30 SECOND] (
    SELECT brand, SUM(price)
    FROM stock [RANGE 1 MINUTE]
    GROUP BY brand
);
```

```
register query_attribute Q1 stream_name=stock
period=30000ms targets=SUM(price);
```

FIG. 4

| # | QUERY NAME | INPUT STREAM NAME | SUB-WINDOW WIDTH | TARGET AGGREGATION FUNCTION | TARGET COLUMN NAME |
|---|---|---|---|---|---|
| 1 | Q1 | stock | 30,000 | SUM | price |
| 2 | ... | ... | ... | ... | ... |

```
register query Q2
RSTREAM [30 SECOND] (
    SELECT brand, MAX(price)
    FROM stock [RANGE 1 MINUTE]
GROUP BY brand
);
```
~1001

```
register query Q3
RSTREAM [30 SECOND] (
    SELECT brand, MIN(price)
    FROM stock [RANGE 1 MINUTE]
GROUP BY brand
);
```
~1002

```
register query Q4
RSTREAM [30 SECOND] (
    SELECT brand, COUNT(price)
    FROM stock [RANGE 1 MINUTE]
GROUP BY brand
);
```
~1003

```
register query Q5
RSTREAM [30 SECOND] (
    SELECT brand, AVERAGE(price)
    FROM stock [RANGE 1 MINUTE]
GROUP BY brand
);
```
~1004

FIG. 11

| 1401 | 1402 | 1403 | 1404 |
|---|---|---|---|
| QUERY NAME | QUERY | QUERY EXECUTION FORMAT STORAGE ADDRESS | TIME RESOLUTION CHANGE METHOD INSTRUCTION TABLE ENTRY |
| Q1 | RSTREAM [30 SECOND] (SELECT brand, SUM (price) FROM stock [RANGE 1 MINUTE] GROUP BY brand); | 0x7FFFAEE1 | 1 |
| ... | ... | ... | ... |

FIG. 12

| # | AGGREGATION DESIGNATED BY QUERY | AGGREGATION OF SUB-WINDOW BASIS IN SUB-WINDOW MANAGEMENT UNIT (METHOD FOR GENERATING AGGREGATION TUPLE Tai OF i-TH SUB-WINDOW) | AGGREGATION OF AGGREGATION TEPLE IN TIME RESOLUTION CHANGE QUERY RESULT GENERATION UNIT |
|---|---|---|---|
| 1 | SUM (summation) | TAi = SUM (STREAM TUPLE WITHIN SUB-WINDOW i) | CALCULATION OF SUM OF AGGREGATION TUPLE: SUM (TAi) |
| 2 | MAX (maximum value) | TAi = MAX (STREAM TUPLE WITHIN SUB-WINDOW i) | CALCULATION OF MAXIMUM OF AGGREGATION TUPLE: MAX (TAi) |
| 3 | MINI (minimum value) | TAi = MIN (STREAM TUPLE WITHIN SUB-WINDOW i) | CALCULATION OF MINIMUM OF AGGREGATION TUPLE: MIN (TAi) |
| 4 | COUNT (count) | TAi = COUNT (STREAM TUPLE WITHIN SUB-WINDOW i) | CALCULATION OF SUM OF AGGREGATION TUPLE: SUM (TAi) |
| 5 | AVERAGE (average value) | TAi_1 = SUM (STREAM TUPLE WITHIN SUB-WINDOW i) TAi_2 = COUNT (STREAM TUPLE WITHIN SUB-WINDOW i) | CALCULATION OF SUM OF ENTIRE AGGREGATION TUPLE AND COUNT OF ENTIRE AGGREGATION TUPLE: SUM(TAi_1)/SUM(TAi_2) |

```
SELECT COUNT(*)
    FROM Requests S [Range 1 Day Preceding]
    WHERE S.domain = 'stanford.edu';
```
1101

STREAM DATA PROCESSING METHOD AND SYSTEM

CLAIM OF PRIORITY

The present application claims priority from Japanese patent application JP 2008-276977 filed on Oct. 28, 2008, the content of which is hereby incorporated by reference into this application.

BACKGROUND OF THE INVENTION

1. Technical Field

The present invention relates to a stream data processing method for processing stream data, which arrives momentarily, in real time, and more particularly to a stream data processing method for defining an upper limit of memory usage of query with use of a time-based window and a system therefor.

2. Description of the Related Art

Up to now, a database management system (hereinafter referred to as "DBMS") dominates data management of a business information system. The DBMS stores data to be processed in a storage, and realizes highly reliable processing typified by transaction processing on the stored data. On the contrary, there increase demands on a data processing system for processing great quantities of data, which arrives momentarily, in real time. For example, from the point of view of financial application that supports stock trading, the system is faced with one of the most important issues that how the system can respond to fluctuations of stock prices quickly. In the system that retrieves, after stock data has been stored in a storage device once, the stored data, as in the conventional DBMS, storage of the data and retrieval processing subsequent to the data storage cannot catch up with the speed of the fluctuations of stock prices, which may lead to a failure to take full advantages of business opportunities.

As a data processing system suitable for the real-time data processing described above, there has been proposed a stream data processing system. For example, the stream data processing system "STREAM" has been disclosed in "Query Processing, resource Management, and Approximation in a data Stream Management System", In Proc. Of the 2003 Conf. on Innovative Data Systems Research (CIDR), January 2003, written by R. Motwani, J. Widom, A. Arasu, B. Babcock, S. Babu, M. Datar, G. Manku, C. Olston, J. Rosenstein, and R. Varma (hereinafter referred to as "Reference 1").

In the stream data processing system, unlike the conventional DBMS, queries (inquiries) are first registered in the system, and the queries are continuously executed together with arrival of data. In the system, stream data is not one large data that is logically continuous such as a video stream, but great quantities of time-series data which is relatively small and logically independent of each other, such as stock price distribution data in the financial application, point-of-sale (hereinafter referred to as "POS") data in a retail trade, probe car data in a traffic information system, error log in a computer system management, sensing data generated from a ubiquitous device such as a sensor or an RFID (radio frequency identification).

Because the stream data continues to arrive at the system, processing in real time cannot be performed when processing starts after waiting for arrival of an end of the stream data. Also, there is a need to process data that has arrived at the system in order of arrival without being affected by a load of data processing. In the above-mentioned STREAM, because real-time processing on the stream data continuously arriving at the system is realized while cutting off part of the stream data with a specified time duration such as latest 10 minutes, or a specified width of number such as latest 1000 data, a concept called sliding window (hereinafter referred to simply as "window") is introduced. As a preferable example of description languages of query including the window designation, there is a CQL (continuous query language) disclosed in "The CQL continuous query language: semantic foundations and query execution", The VLDB Journal, Volume 15, Issue 2, pp. 121 to 142, June 2006, written by A. Arasu, S. Babu and J. Widom (hereinafter referred to as "reference 4"). The CQL employs brackets subsequent to a stream name for a "FROM" clause of an SQL (structured query language) widely used in the DBMS, thereby being subjected to extension for designating a window. The details of SQL are disclosed in "A Guide to SQL Standard ($4^{th}$ Edition)", Addition-Wesley Professional; 4th Edition (Nov. 8, 1996), ISBN: 0201964260, written by C. J. Date, and Hugh Dawen (hereinafter referred to as "reference 2").

A query 1101 of FIG. 14 is an example of query using the CQL disclosed in Section 2.1 of reference 1. In the query, the total number of accesses from a domain "stanford.edu" for the past one day from the present is calculated in a certain web proxy server. "Requests" is web access data continuously arriving at the web proxy server, and not static data such as a table dealt with by a conventional DBMS, but seamless stream data. For that reason, the total number of accesses cannot be calculated without designating which part of stream data is to be processed by the aid of window designation "[Range 1 Day Preceding]". Stream data cut off by the window is retained on a memory, and used in query processing.

The representative window designating methods include a Range window (hereinafter referred to as "time-based window") designating the width of window by a time, and a Row window (hereinafter referred to as "row-based window") designating the width of window by the number of data. For example, when [Range 10 minutes] is set with the use of the time-based window, stream data for the latest 10 minutes is to be query processed, and when [Rows 10] is set with the use of the row-based window, stream data for the latest 10 rows is to be query processed.

Under the circumstances, Motwani, et al., "Caching Queues in Memory Buffers", In Proc. Of SODA 2004 (hereinafter referred to as "reference 3") discloses a method for storing stream data not stored in a memory in a magnetic disc.

On the other hand, US Patent Publication US 2007/0226239 discloses a method of discarding part of data by sampling when the volume of data to be processed increases, to thereby delete the memory usage.

BRIEF SUMMARY OF THE INVENTION

However, the stream data processing systems disclosed in reference 1 and reference 2 are expected to be applied to not only the above-mentioned financial application but also diverse applications that analyze data generated at a high rate in real time such as access monitoring, communication monitoring, or manufacture monitoring in a car probe, web, and a computer system. In those applications, great quantities of data may come in a short time in a bursty manner. For example, in the stock trading system being a typical example of the financial applications, a large amount of sell and buy orders occur when the trading starts and just before the trading terminates. In the case of using the above-mentioned time-based window, stream data falling within a width T of the time designated by the time-based window is to be processed. The volume of data falling within the width T depends on stream data arriving at the system. Therefore, it is difficult to predict the number of sell and buy requests coming within one hour, as well as it is difficult to estimate the volume of stream data in advance. In the stream data processing, because data on the window is developed on a memory from the viewpoint of a demand for high-speed processing, it is difficult to estimate the memory usage when the time-based window is used. Also, when stream data comes in a bursty manner, it is difficult to ensure the memory allocation, resulting in a risk that the stability of the system is destroyed.

Further, in the financial and communication applications, etc. which require high performance, the use of the magnetic disc as disclosed in Reference 3 may not satisfy the performance conditions such as latency. Also, the method disclosed in U.S. Patent Publication No. US 2007/0226239 is difficult to apply to applications that requires precise calculation reflecting all of input data.

When a query including the time-based window is processed in the stream data processing system that realizes the real-time data processing, there is a need to keep a constant memory usage even when the stream data arriving at the system increases. In addition, in several applications including the financial application, it is necessary to execute precise calculation including no proximate value, taking all of input data into consideration.

From the viewpoint of the above demand, there is required a processing method which is capable of regulating an upper limit of the memory usage, and executing precise calculation taking all of data into consideration, even when the stream data comes in the bursty manner in processing the query using the time-based window. However, the above-mentioned stream data processing method has not been realized.

An object of the present invention is to provide a stream processing method that realizes precise calculation processing which keeps a constant memory usage of the query including the time-based window and takes all of input data into consideration, and a stream data processing system therefor.

In order to achieve the above-mentioned object, according to one aspect of the present invention, there are provided a stream data processing method in a system conducting query processing on stream data, the method comprising: sectioning, when a query includes a time-based window in which stream data arriving at the system within a given time interval is to be processed, the time-based window into sub-windows each having a smaller width; generating at least one aggregation tuple that aggregates the stream data included within the sub-window; and calculating a query processing result based on the aggregation tuple, and a stream data processing system therefor.

Also, in order to achieve the above-mentioned object, according to another aspect of the present invention, there are provided a stream data processing method in a system conducting query processing on stream data, the method comprising: sectioning, when a query includes a time-based window in which stream data arriving at the system within a given time interval is to be processed, the time-based window into sub-windows each having a smaller width; generating, when the received stream tuple is sectioned into a new sub-window, an aggregation tuple within the sub-window; setting a termination time of a lifetime of the aggregation tuple to a time obtained by adding a width of the time-based window designated by the query to a time stamp of the received stream tuple; updating the aggregation tuple based on the stream tuple when the received stream tuple is sectioned into the existing sub-window; setting the lifetime termination time of the updated aggregation tuple to a time obtained by adding a width of the time-based window designated by the query to the time stamp of the received stream tuple; generating a stream tuple with a flag for erasing the aggregation tuple at the set lifetime termination time; and calculating a query processing result based on those aggregation tuples, and a stream data processing system therefor.

According to the present invention, the upper limit of the memory usage can be kept constant even when the stream data to be input increases in processing the query including the time-based window, thereby contributing to ensuring of the system stability and facilitation of the operational management.

BRIEF DESCRIPTION OF THE DRAWINGS

FIG. 2 is a diagram showing an example of a query to be changed in query time resolution according to the first embodiment;

FIG. 3 is a diagram showing an example of a query time resolution change designation according to the first embodiment;

FIG. 4 is a diagram showing a storage example of a query time resolution change designation content according to the first embodiment;

FIG. 10 is a diagram showing an example of a query enabling the time resolution change according to respective embodiments;

FIG. 11 is a diagram showing a storage example of the query according to the first embodiment;

FIG. 12 is a table showing a method for realizing query processing;

FIG. 14 is a diagram showing a query descriptive example using a query processing language.

DETAILED DESCRIPTION OF THE INVENTION

Hereinafter, a description will be given of various embodiments of the present invention with reference to the accompanying drawings.

The typical summary of the present invention among the invention disclosed in the present specification will be described below. That is, in the typical embodiment, the time-based window is sectioned into sub-windows each having a smaller width, aggregation processing on the sub-window basis is executed when receiving stream data to generate an aggregation tuble, and a calculation result of the query including a time-based window is calculated by the aggregation processing on the aggregation tuble.

For example, let us consider that the total number of sales data included in the time-based window with the width T is calculated. When there are 10 sales within a time of the width T, it is only necessary for the time-based window to retain data for only 10 sales when there are 10 sales within the width T. However, when there are 10,000 sales, the time-based window must retain data for 10,000 sales. Under the circumstances, the width of the sub-window is set to TS (TS≦T) with respect to the width T of the time-based window, and the aggregation tuple in which the sales data is aggregated on the TS time basis is generated to discard original data. As a result, it is only necessary to retain only the aggregation tuble based on the TS time in the memory, regardless of the number of original data, thereby making it possible to keep the memory usage constant. When the total number of sales for the entire width T is calculated, the total number of aggregation tuples in the respective TSs is calculated, thereby enabling a precise calculation result using no approximation to be obtained.

In the processing using the window of the stream data processing, the individual stream tuple has a lifetime. A termination time of a lifetime of the aggregation tuple is set to a time when the aggregation value in the sub-window is finally updated, that is, a time when the width T of the time-based window is elapsed from the final update time of the aggregation tuple. At the lifetime termination time of the aggregation tuple, a minus tuple of the aggregation tuple indicative of the lifetime ending is generated, and the minus tuple is reflected at the time of calculating the total number of sub-windows to again calculate the entire aggregation value.

First Embodiment

Figure 1:
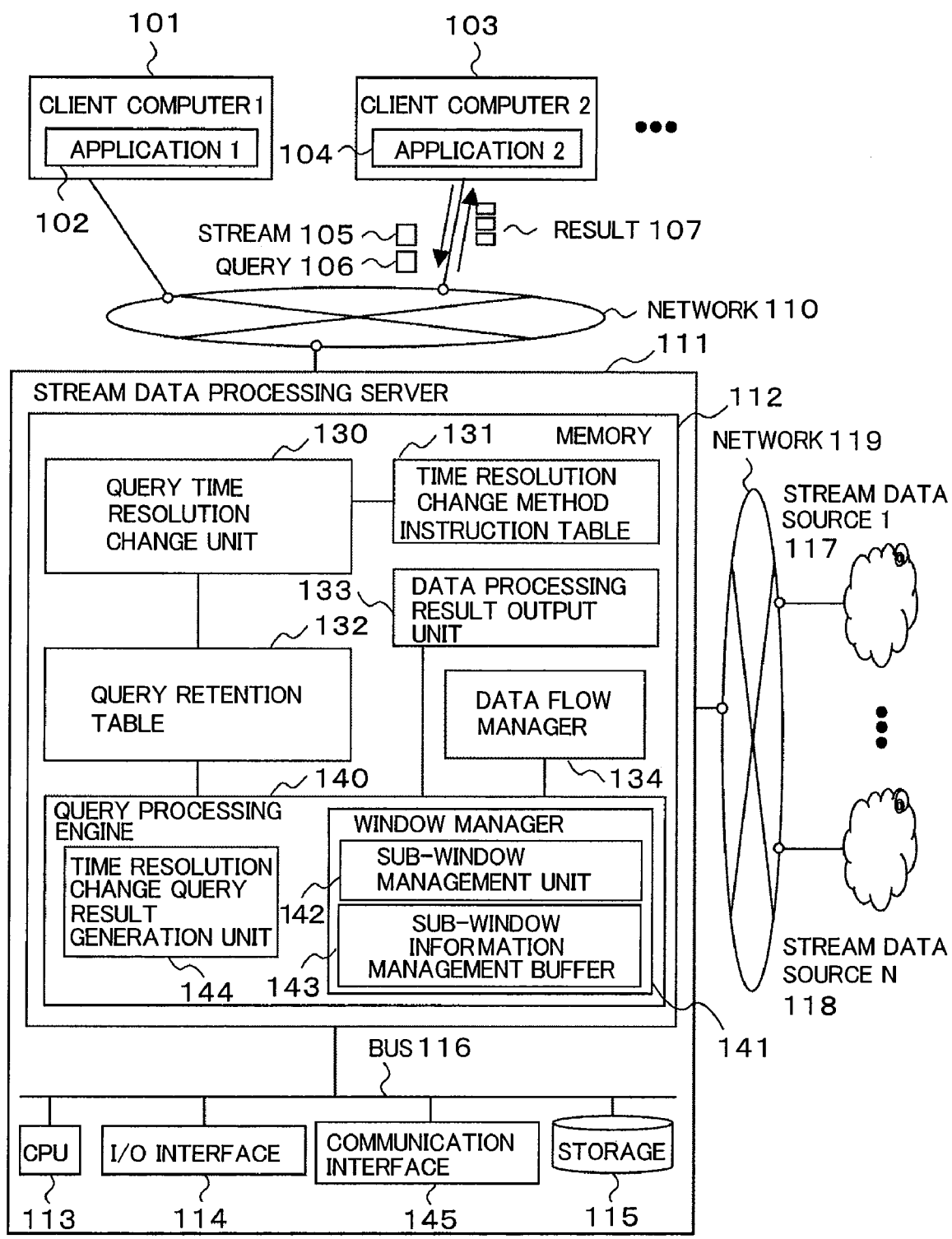
FIG. 1 is a diagram showing the configuration of a stream data processing system according to a first embodiment.

FIG. 1 shows one configuration of a stream data processing system (hereinafter referred to also simply as "system") according to a first embodiment. A client computer 101 executing an application 1 (102) and a client computer 103 executing an application 2 (104) are connected to a stream data processing server 111 operated by the stream data processing system through a network 110. The network 110 may be configured by Ethernet (registered trademark), a local area network (LAN) connected by an optical fiber or the like, or a wide area network (WAN) including an internet lower in processing speed than the LAN. Also, the client computers 101 and 103 may be each configured by an arbitrary computer system such as a personal computer (PC) or a blade computer system.

The stream data processing server 111 is a computer in which a communication interface 145 and an I/O interface 114 which configure an interface part, a central processing unit (CPU) 113 configuring a processing part, and a memory 112 being a storage part are connected to each other via a bus 116. The computer may be configured by a blade computer system, an arbitrary computer system such as a PC server, or a data processing device. The stream data processing server 111 accesses to the client computer 101, 103, and a data source which will be described later through the communication interface 145.

When the stream data processing server 111 stores a stream data processing result, an intermediate result of processing, and setting data necessary for system operation in a nonvolatile storage, a storage device 115 being a storage part connected to the stream data processing server 111 can be employed. The storage device 115 is connected thereto through the I/O interface 114 of the stream data processing server 111, or connected over the network through the communication interface 115.

The stream data processing system operates in the stream data processing server 111. FIG. 1 shows main components of the stream data processing system. Blocks other than a time resolution change method instruction table 131 and a query retention table 132, shown in the memory 112, schematically indicate functions operating in the CPU 113, respectively. The applications 1 and 2 first register a stream 105 to be processed in the CPU 113, and then registers a query 106 describing how to process the stream. The registered query is analyzed by a query time resolution change unit 130. The query time resolution change unit 130 refers to the time resolution change method instruction table 131, changes the time resolution of the query as occasion demands, and registers the query in the query retention table 132.

Figure 6:
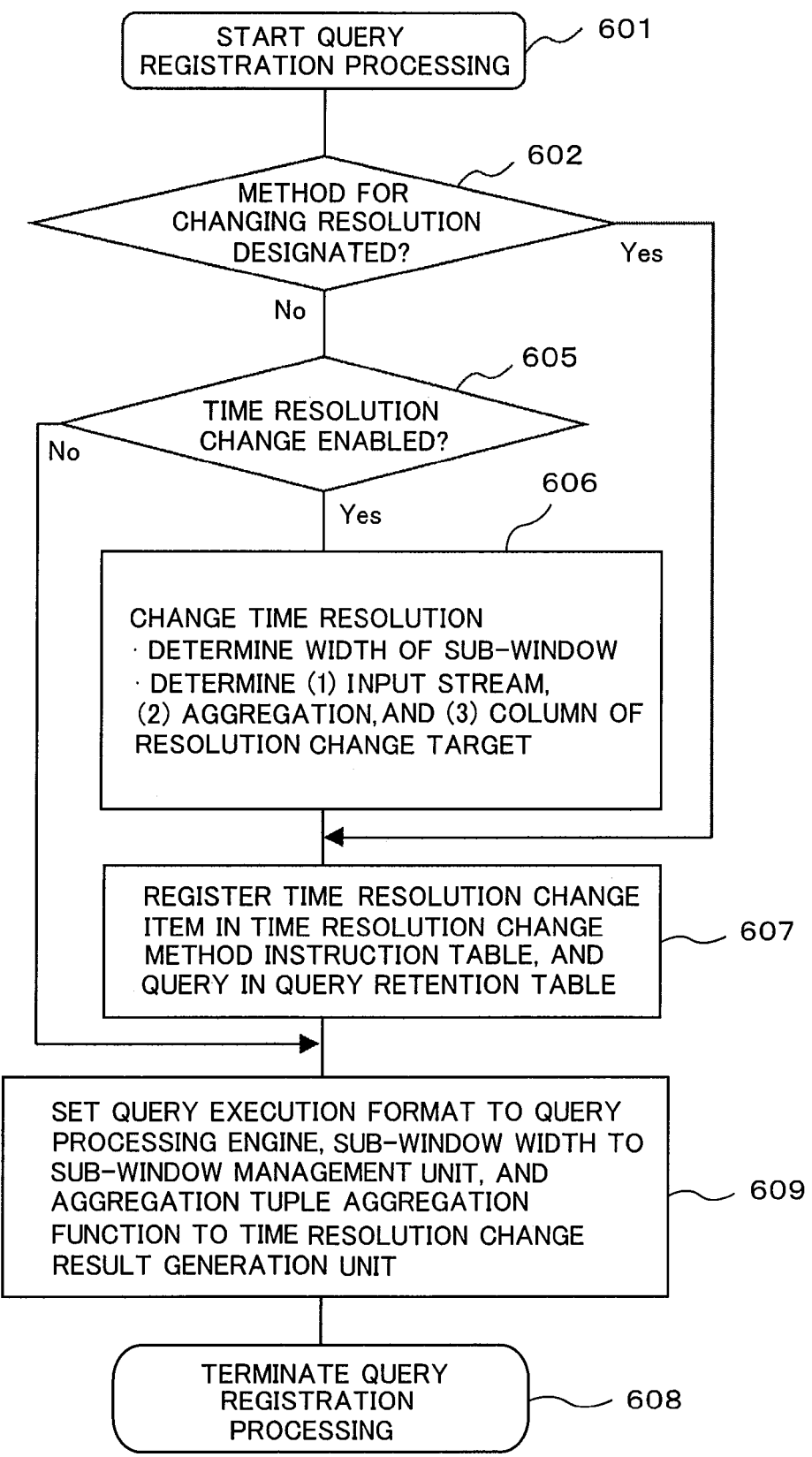
FIG. 6 is a flowchart showing query registration processing according to the first embodiment.

A preferable configuration example of the query retention table will be described with reference to FIG. 11. The query retention table includes a query name (1401), a query string (1402), a query execution format address (1403), and a time resolution change method instruction table entry (1404). The entry of the query Q1 shown in FIG. 11 is an example in which the time resolution change designation shown in FIG. 3 is given for the query designation shown in FIG. 2, and its entry is stored in #1 of FIG. 4. In this embodiment, the query retention table shows only the minimum items to be retained in the query retention table, which are required for execution of the query including the time resolution designation. The query retention table may also include items indicative of a registrant of the query, a registration date of the query, an execution start time of the query, an executing termination time of the query, a stream to be executed in query, and so on. A procedure of query registration in the stream data processing system when using no time resolution change processing, a method for storing data in the stream data processing system, a storage format, an analyzing method after receiving the query, an optimizing method, a method for creating the execution format of the query, a method for registration in the system, a method for registering the stream in the stream data processing system, and a data retaining method in the system are disclosed with their preferable implementation methods in Japanese Patent Application Laid-Open Publication No. 2006-338432, "Query processing method for a stream data processing system". In the present invention, the entry of the time resolution change method instruction table is included in the query retention table produced in the above-mentioned method. The entry is inserted by the query time resolution change unit in Step 607 of a flowchart shown in FIG. 6, and registered in a query processing engine 140. The query retention table 132 may be retained in the memory 112 of the stream data processing server 111, or may be stored in the storage device 115 connected to the stream data processing server 111.

Great quantities of data momentarily arrives at the stream data processing system through the network 119 from a stream data source 1 (117) to a stream data source N (118) being at least one stream data source. This data is called "stream data". Preferable examples of the stream data include stock price distribution information in a financial application, POS data in a retail trade, probe car data in a traffic information system, error log in a computer system management, and so on. In the stream data processing system, stream data received by a data flow manager 134 through the communication interface 145 is converted into a stream tuple with a time stamp, and fed to a query execution format loaded in the query processing engine 140 which will be described later. Further, in the present invention, when the query execution format is loaded in the query processing engine 140, the query resolution change unit refers to the time resolution change method instruction table, sets a sub-window width corresponding to the loaded query for a sub-window management unit, and sets an aggregation tuple aggregation function for a time resolution change query result generation unit 144.

As described above, in order to deal with stream data being great quantities of time-series data which continuously comes, and is relatively small and logically independent from each other, the stream data processing system uses the window. A window manager 141 is applied to the window processing of the query execution format loaded in the memory. The window manager 141 shown in FIG. 1 applies window operation designated by the query to the coming stream data, and sets the lifetime in the system of the stream tuple. A time when stream data is inserted into the window corresponds to a start time of the lifetime, and a time when the stream data is deleted from the window corresponds to a termination time of the lifetime. In the time resolution change query processing according to this embodiment, the stream tuple received by the window manager 141 is aggregated on the window basis by the sub-window management unit 142, and an aggregation tuple being an aggregation result is stored in a sub-window information management buffer 143. A time resolution change query result generation unit 144 further executes aggregation calculation on the aggregation value based on the sub-window to generate a processing result on the given query, and returns a result 107 to the application through a data processing result output unit 133.

Hereinafter, the above-mentioned respective processing will be described in detail. First, the query registration processing will be described with reference to FIG. 6. When a query is given from an application, processing starts (Step 601). The query time resolution change unit 130 checks whether the time resolution change method for the query has been designated, or not (602). When the time resolution change method has been designated (when yes is selected in Step 602), the query time resolution change unit 130 registers a designated item in the time resolution change method instruction table 131, and also generates the execution format of the query to register the execution format in the query retention table 132 (607), thus terminating the query registration processing (608). In this embodiment, the query to be processed is a query Q1 (201) in FIG. 2, and reference numeral 301 in FIG. 3 is a designation of the time resolution change. The processing contents of the query and the time resolution change contents will be described in detail later.

When the time resolution change method for the query given from the application is not designated (when No is selected in Step 602), the query time resolution change unit 130 checks whether the time resolution change is enabled, or not (605). When it is determined that the time resolution change is disabled (when No is selected in Step 605), the query time resolution change unit 130 terminates the query registration processing. In this flowchart, when the change is disabled, the query time resolution change unit 130 does not register the query. However, it is possible to execute the query without changing the time resolution, that is, without keeping the constant memory usage, by giving a warning to application. When the time resolution change is enabled (when Yes is selected in Step 605), the query time resolution change unit 130 determines a width of the sub-window, an input stream to be changed in resolution, an aggregation target, and a column, which are items necessary for the time resolution change (606), registers those information in the time resolution change method instruction table 131, and generates the execution format of the query to register the address on the memory in the query retention table 132 (607). Finally, the time resolution change unit 130 registers the query execution format in the query processing engine 140, sets the sub-window width designated for the query for the sub-window management unit 143, and sets the aggregation tuple aggregation function for the time resolution change query result generation unit 144 (609), thus terminating the query registration processing. Although a determining step in Step 605 will be described later, when it is determined that first processing on the window to which the time-based window is set during the determining step can be set to the aggregation processing, the first processing on the stream for which the time-based window is set is set to the aggregation processing in generating the execution format of the query.

When the width of the sub-window is made smaller, the number of aggregation tuples to be retained in the query processing increases, and therefore, the memory usage increases. As a method for determining the sub-window width, there is proposed, for example, a method in which a product of the number of sub-windows and the number of aggregation values retained in the respective sub-windows is calculated, a product of the calculated value and the memory size used for the respective aggregation values is calculated, and the sub-window width is determined so that the calculation value falls within the available memory size.

Figure 7:
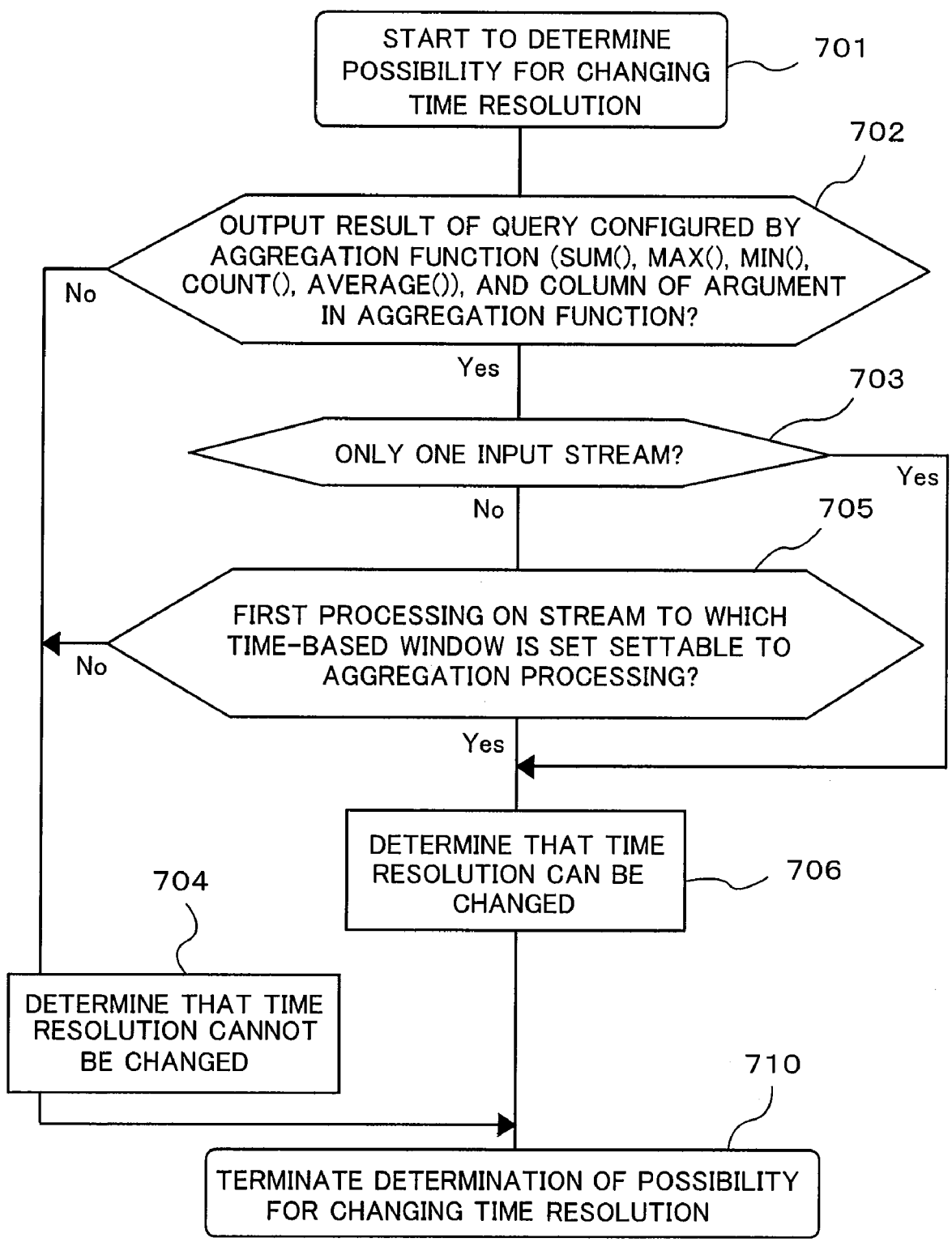
FIG. 7 is a flowchart showing a query time resolution change rewritablity check and rewrite processing according to the first embodiment.

The method for determining whether the time resolution change is enabled, or not, will be described with reference to FIG. 7. First, it is checked whether the output result of the query consists of an aggregation function, and a column of a factor of the aggregation function, or not (702). When the output result includes a column other than the factor of the aggregation function (when No is selected in Step 702), it is determined that the time resolution change is disabled (704), and the determination processing is terminated (710). When the output result of the query consists of the aggregation function, and the column of the factor of the aggregation function (when Yes is selected in Step 702), the number of input streams is checked (703). When the number of input streams is only one, it is determined that the time resolution change is enabled (706), and the determination processing is terminated (710).

When a plurality of input streams exist, it is checked whether first processing on the window to which the time-based window is set can be set to the aggregation processing, or not, (705). For example, the first processing on the streams is join processing, and it is checked whether an execution plan for executing grouping and aggregation processing subsequently to the join processing can be converted into an execution plan for executing the grouping and aggregation processing in advance, and thereafter executing the join processing, or not. The determining method of whether the conversion is enabled, or not, and the converting method, are disclosed in "Including group-by in query optimization", in proc. Of 20$^{th}$ VLDB, pp. 354-366, 1994, section 3, written by S. Chaudhuri and K. Shim. When the first processing on the window to which the time-based window is set cannot be set to the aggregation processing (when No is selected in Step 705), it is determined that the time resolution change is disabled (704), and the determination processing is terminated (710). When the first processing can be set thereto (when Yes is selected in Step 705), it is determined that the time resolution change is enabled (706), and the determination processing is terminated (710). The above description of the method for registering the query is completed, and the time resolution change processing method for the query will be described below.

Symbol Q1 shown in FIG. 2 is a query for calculating sales of each brand with the latest one minute of the stream to be processed, and outputting the calculation results every 30 seconds. In the case of Q1, the aggregation group is for each brand. In the case where Q1 is processed without changing the time resolution, when great quantities of sell and buy information comes as stream data in one minute, it is necessary to retain the individual pieces of data in the time-based window, and the memory usage of the system increases. For that reason, a description will be given below of a method in which the time-based window for one minute is sectioned into sub-windows each for 30 seconds to calculate the aggregation value of each sub-window with respect to the intended stock sell and buy stream of Q1, and the calculation result of the query Q1 is obtained by further aggregation (re-aggregation processing) of the aggregation value.

A preferable time resolution change instruction method for a user or application (hereinafter referred to simply as "application") to designate the calculation method for the system is shown by reference numeral 301 of FIG. 3. In reference numeral 301, the time resolution is set to 30000 ms, that is, 30 seconds, with respect to the intended stream stock of the query Q1, to calculate the sales SUM(price).

Figure 13:
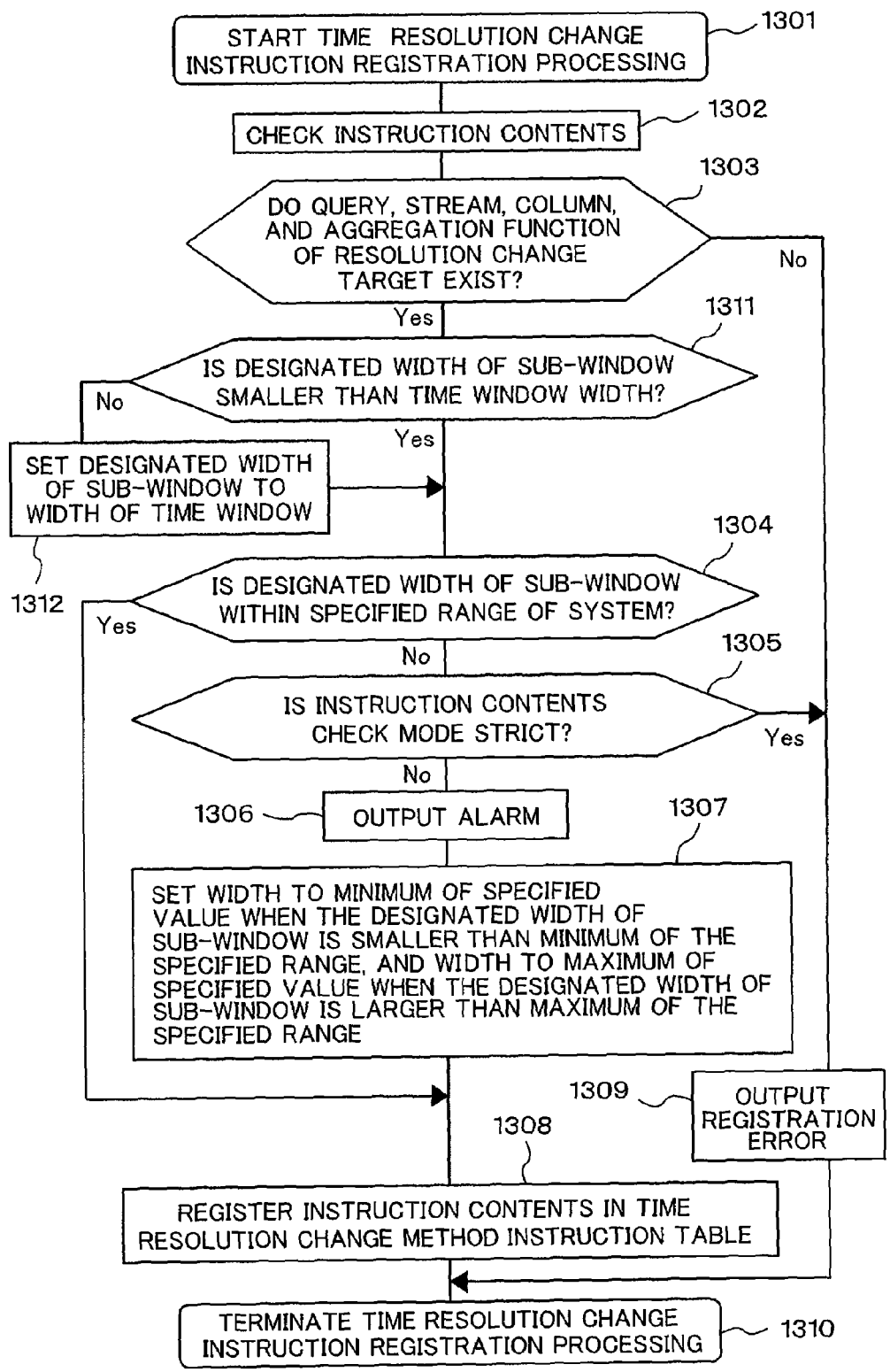
FIG. 13 is a flowchart showing query time resolution change instruction registration processing according to the first embodiment.

A registration processing method when the time resolution change instruction has been input to the system will be described with reference to FIG. 13. When the time resolution change instruction is input to the system to start processing (1301), the system checks the instruction contents (1302). When the query, stream, column, and aggregation function to be changed in resolution do not exist in the system (when No is selected in Step 1303), a registration error is output (1309) to terminate registration processing (1310). When the query, stream, column, and aggregation function to be changed in resolution exist in the system (when Yes is selected in Step 1303), a relationship between the designated width of the sub-window and the width of the time-based window of the query to be changed in time resolution is checked (1311). When the designated width of the sub-window is smaller than the width of the time-based window (when Yes is selected in Step 1311), processing is advanced to a subsequent step. When the designated width of the sub-window is larger than the time-based window width (when No is selected in Step 1311), the designated sub-window width is set to the time-based window width (1312), and processing is advanced to a subsequent step.

Then, it is checked whether the designated width of the sub-window falls within a specified range of the system, or not (1304). It is assumed that the minimum and maximum of the specified range of the width of the sub-window in the system are TMIN and TMAX, respectively. The TMIN and TMAX are determined by a system designer and a system administrator taking a hardware operated by the system, an operating system, and the resource quantity usable by the system into consideration. For example, when the minimum time resolution in the operating system is TOSMIN, because the width of the sub-window cannot be made smaller than that of the TOSMIN, TMIN≧TOSMIN is satisfied. When the designated width TDIS of the time resolution change instruction falls within the specified range of the system, that is, when TMIN≦TDIS≦TMAX is satisfied (when Yes is selected in Step 1304), the instruction content is registered in the time resolution change method instruction table (1308), and the time resolution change instruction registration processing is terminated (1310). When the designated width of the sub-window does not fall within the specified range of the system, that is, when TDIS<TMIN, or TDIS>TMAX is satisfied (when No is selected in Step 1304), a time resolution change instruction mode of the system is checked. When an instruction contents check mode is strict (when Yes is selected in Step 1305), the registration error is output (1309), and the registration processing is terminated (1310). When the instruction contents check mode is not strict (when No is selected in Step 1305), a warning is output from the query time resolution change unit 130 (1306). When the designated sub-window width is smaller than the minimum value of the specified range (in the case of TDIS<TMIN), the width is set to the minimum value of the specified value (to TDIS=TMIN), and when the designated sub-window width is larger than the maximum value of the specified range (in the case of TDIS>TMAX), the width is set to the maximum value of the specified value (to TDIS=TMAX) (1307), and the instruction contents are registered in the time resolution change method instruction table (1308), and the time resolution change instruction registration processing is terminated (1310).

In this embodiment, the instruction contents check mode is referred to in Step 1305. The instruction contents check mode may be set for the entire system, or set on the query basis. The storage location may be in the query retention table 132, or in the storage device 115 connected to the system. Further, there can be applied a realizing method in which the designation per se of the instruction contents check mode is set as a specified value of the system, that is, it is determined whether the check mode is made strict, or not, at the time of the system establishment, and the check of Step 1305 is not conducted at the time of execution.

The above-mentioned registration results are managed in the system, for example, as the time resolution change method designation table 131 of a format shown in FIG. 4. Number 401, a query name 402, an input stream name 403, a sub-window width 404, a target aggregation function 405, and a target column name 406 are managed for each registration in the time resolution instruction table 131.

Figure 5:
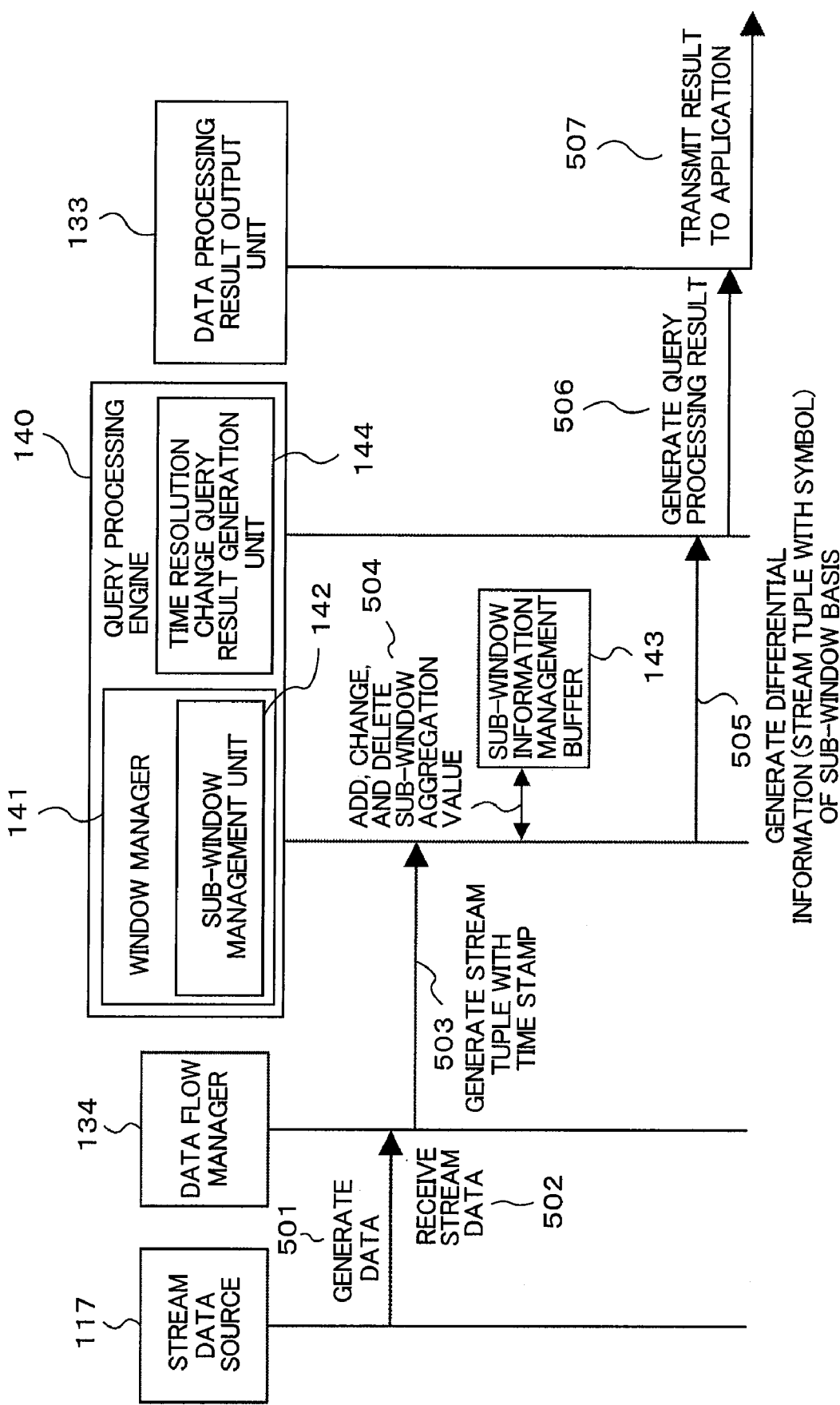
FIG. 5 is a diagram showing a sequence of query time resolution change processing according to the first embodiment.

A description will be given of a processing sequence when the system stream data comes after the query and the time resolution change method have been designated with reference to FIG. 5. The stream data source 117 generates stream data. The generated stream data (501) is received by the data flow manager 134 of the system through the network 116 and the communication interface 145 (502). The data flow manager 134 that has received the stream data generates a stream tuple retaining a time stamp from the stream data (503), and transmits the stream tuple to the query processing engine 140. The data flow manager 134 can operate in any mode of a server time stamp mode using a time when the stream data has arrived at the system as the time stamp, and an application time stamp mode using time information given to the stream data as the time stamp.

When the window manager 141 of the query processing engine 140 has received the stream tuple, the sub-window management unit 142 in the window manager 141 calculates an aggregation valued based on the sub-window, adds the aggregation value to the sub-window information management buffer 143, and updates the aggregation value (504). Further, the sub-window management unit 142 generates differential information (stream tuple with a symbol of plus) on a new aggregation value followed by the addition and update (505), and transmits the differential information to the time resolution change query result generation unit 144. Also, when the lifetime of the aggregation tuple is terminated, the sub-window management unit 142 deletes the aggregation tuple from the sub-window information management buffer 143, generates differential information (stream tuple with a symbol of minus) followed by the deletion, and transmits the differential information to the time resolution change query result generation unit 144. The time resolution change query result generation unit 144 generates the calculation result of the query from the differential information (506), and transmits the calculation result to the data processing result output unit 133. The data processing result output unit 133 transmits the query processing result to application according to a data output method specified by the query (507). The data output specifying method using the query will be described later.

Figure 9:
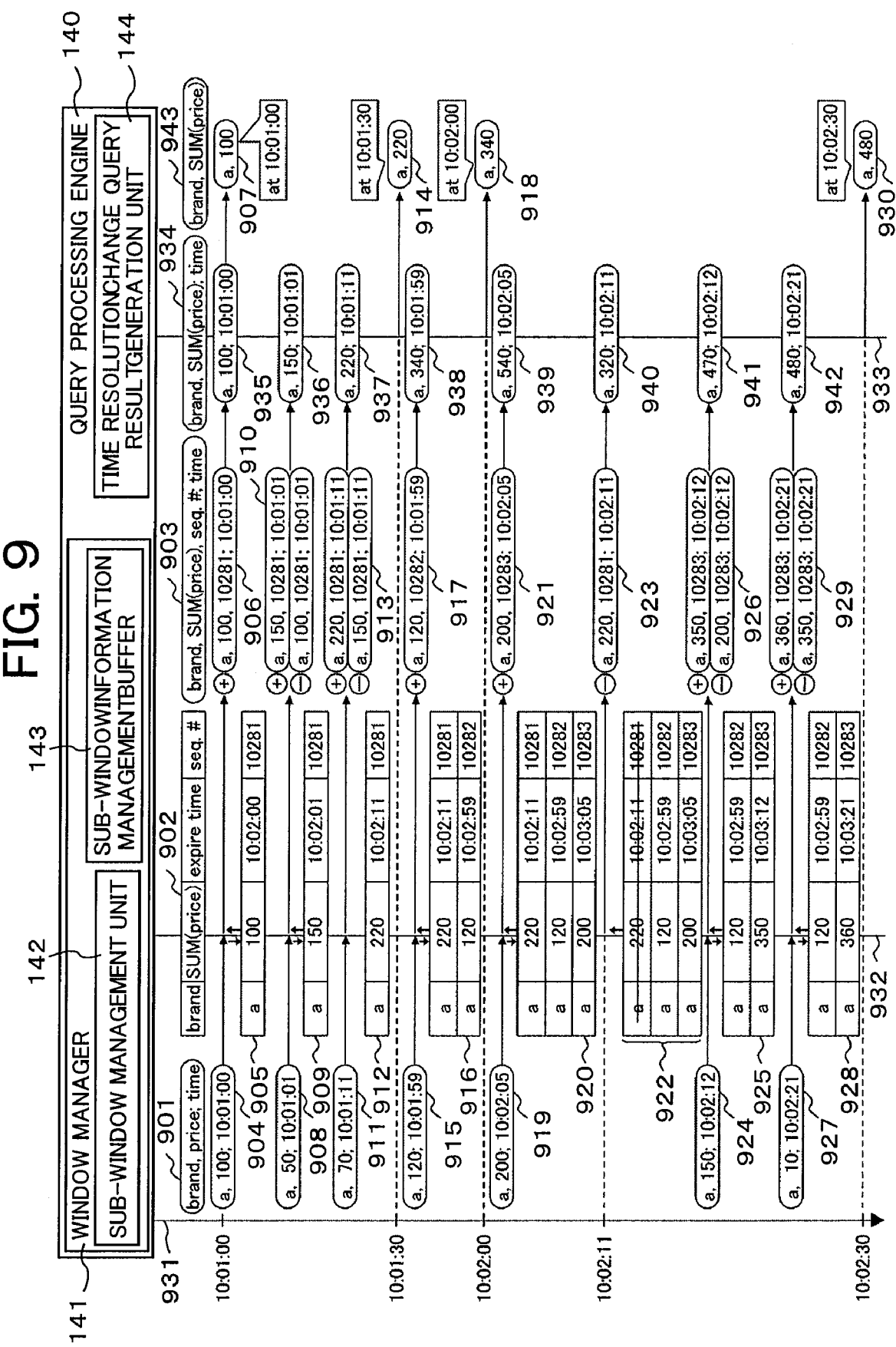
FIG. 9 is a diagram showing a specific example of the query time resolution change processing according to the first embodiment.

Since characteristic processing for the time resolution change in a series of processing sequences is conducted in the window manager 141, processing when stock trading (stock) stream data arrives at the system for the above-mentioned Q1 will be described in detail with reference to FIG. 9. FIG. 9 is a sequence diagram showing how the stream tuple is processed in the window manager 141 with time. Time advances from above of the figure toward the lower side as indicated by an arrow 931 on the left side of the figure. Vertical lines 932 and 933 in the figure represent processing in the sub-window management unit 142 and the time resolution change query result generation unit 144, respectively. Reference numeral 901, 902, 903, 934, and 943 represent legends of the stream tuple transmitted to the window manager 141, the aggregation tuple managed by the sub-window information management buffer 143, the differential information generated by the window manager 141, the aggregation result retained by the time resolution change query result generation unit 144, and the query processing result finally returned to the application, respectively.

As indicated by reference numeral 901, the stock stream retains a brand (brand) and a sale price (price) as components, and the stream tuple transmitted to the window manager includes the brand, the price, and the time stamp (time). The query Q1 (201) has a time-based window for one minute. A query processing method when the time resolution change designation (301) shown in FIG. 3 is applied to Q1 will be described. It is assumed that a start time of the query processing is 10:01:00. The stream tuple (a, 100; 10:01:00) comes at time 10:01:00 (904). The window manager that has received the stream tuple produces an aggregation tuple 905 in the sub-window management unit. In this embodiment, the lifetime termination time (expire time) of the aggregation tuple, and information (sequence number: seq. #) for identifying sections of the sub-windows based on the time resolution are appended to the aggregation tuple in addition to columns necessary for the final result calculation of the query (in this case, brand column and SUM(price) column). The lifetime termination time of the aggregation tuple is calculated by adding a time duration designated by the time-based window of the query to a time (lifetime start time) at which the aggregation tuple is generated. In the query Q1 of this embodiment, since the width of the time-based window is one minute, 10:02:00 one minute after the aggregation tuple generation time 10:01:00 is set as the lifetime termination time. The method for managing the information for identifying the sections of the sub-windows is allowed to include the information in the same record as that of data as in this embodiment, or to manage the information as different data linkable from data. The produced aggregation tuple 905 is registered in the sub-window information management buffer 143. Then, the window manager outputs a change of the aggregation value followed by production of the aggregation tuple as differential information. A lot of variations are proposed for the differential information expression, but in this embodiment, the differential information is expressed by the stream tuple with the symbol. In the case of the aggregation tuple 905, since the aggregation tuple is newly generated, a stream tuple 906 with a symbol of plus is generated as the differential information, and transmitted to the time resolution change query result generation unit 144. The time resolution change query result generation unit 144 receives the differential information on the aggregation tuple based on the sub-window unit to generate the calculation results of the entire query. When the time resolution change query result generation unit 144 has received the stream tuple 906 with the symbol of plus as the differential information, since no past aggregation value exists, the time resolution change query result generation unit 144 generates the stream tuple 935 as the aggregation value of the entire query.

In the query Q1, an instruction for transmitting the calculation result of the query to the application at 30-second intervals is given by the RSTREAM [30 SECOND] phrase designation. The section 6.3 of reference 4 discloses preferable methods for outputting the stream data from the stream data processing system. The first method is an ISTREAM phrase for outputting an increment from a previous output time in the stream system, the second method is a DSTREAM phrase for outputting a decrement from a previous output time in the stream system, and the third method is an RSTREAM phrase for outputting the entire output target in the stream system at that time point. In this embodiment, a case in which the RSTREAM phrase is designated will be described. However, the present invention can be applied to a case in which the ISTREAM phrase or the DSTREAM phrase is designated. Reference 4 does not disclose a method for designating output intervals with respect to the RSTREAM phrase. On the other hand, this embodiment expands the RSTREAM phrase to enable the output intervals to be designated.

In processing of Q1, a query processing result (a, 100) is output at 10:01:00 as a first output (907). Subsequently, the stream tuple 908 comes at time 10:01:01. As described above, because the time resolution is set to 30 seconds in this embodiment, the stream tuple is sectioned into the same sub-windows as those of the stream tuple 904 having processed in advance. For that reason, the sub-window management unit 142 having received the stream tuple updates the entry of sequence number 10281 generated when the stream duple 904 is added, and produces an aggregation tuple 909. In the update processing, the update processing of the lifetime termination time is also implemented in addition to the aggregation value. In this case, since the time stamp of the input stream tuple is 10:01:01, the lifetime termination time is updated at 10:02:01 obtained by adding one minute being the width of the time-based window of the query to the above time. As the differential information followed by the update, the stream tuple with a symbol of plus which retains a value 150 not yet updated, and a stream tuple 910 with a symbol of minus which retains an updated value 100 are generated, and transmitted to the time resolution change query result generation unit 144. The time resolution change query result generation unit 144 generates a query processing result 936 by the aid of the differential information. As described above, in Q1, because the query processing result output designation from the application is executed every 30 seconds by the RSTREAM phrase, the result is not output to the application in this timing. Even when the stream tuple 911 comes at time 10:01:11, the completely same update processing is executed, and a stream tuple 937 of the query processing result is generated in the time resolution change query result generation unit. In the result output timing designated from application of time 10:01:30, (a, 220) being the query processing result at that time point is transmitted to the application.

Then, a stream tuple 915 comes at time 10:01:59. Because the time resolution of this embodiment is 30 seconds, and the section of the first sub-window is at 10:01:00, the stream tuple 915 is sectioned into sub-windows different from those of the three stream tuples 904, 908, and 911 having come up to now.

For that reason, the sub-window management unit 142 produces the entry of a new aggregation tuple with new sequence number corresponding to the stream tuple 915, and stores the new aggregation tuple in the sub-window information management buffer 143 (916). At the same time, the sub-window management unit 142 generates a stream tuple 917 with a symbol of plus as differential information followed by the generation of the new aggregation tuple, and transmits the stream tuple 917 to the time resolution change query result generation unit 144. The time resolution change query result generation unit 144 updates the aggregation result by the aid of the received differential information (938).

At time 10:02:00, {a, 340} being the query processing result at that time point is transmitted to the application in the same manner as that at time 10:01:30 (918). Then, when a new stream tuple 919 comes at time 10:02:05, the tuple is different in section of the sub-window from the stream tuple 915 having come before the stream tuple 919. Therefore, an entry 920 of a new aggregation tuple is generated in the sub-window information management buffer 143, differential information 921 followed by generation of the aggregation tuple is generated, and the query processing result is updated in the time resolution change query result generation unit 144 (939).

At time 10:02:11, the lifetime of the aggregation tuple whose sequence number is 10281 is expired. Under the circumstances, the sub-window management unit 142 deletes the entry of the aggregation tuple of sequence number 10281 from the sub-window information management buffer 143 (922), and also transmits the differential information followed by the deletion processing to the time resolution change query result generation unit 144 (923). The time resolution change query result generation unit 144 updates the aggregation value by the aid of the differential information (940). Subsequently, the same processing is executed even when stream duples 924 and 927 come, and a query processing result {a, 480} is transmitted to the application at 10:02:30 (930).

In this embodiment, for simplification, there is shown the processing sequence in the case of one kind of stock brand (brand). On the other hand, when there is a plurality of stock brands, the same processing can be executed by managing the aggregation tuple by the sub-windows for each stock brand. That is, the unit of aggregation can be set to each brand (brand) being an aggregation group designated by the query Q1.

Figure 8:
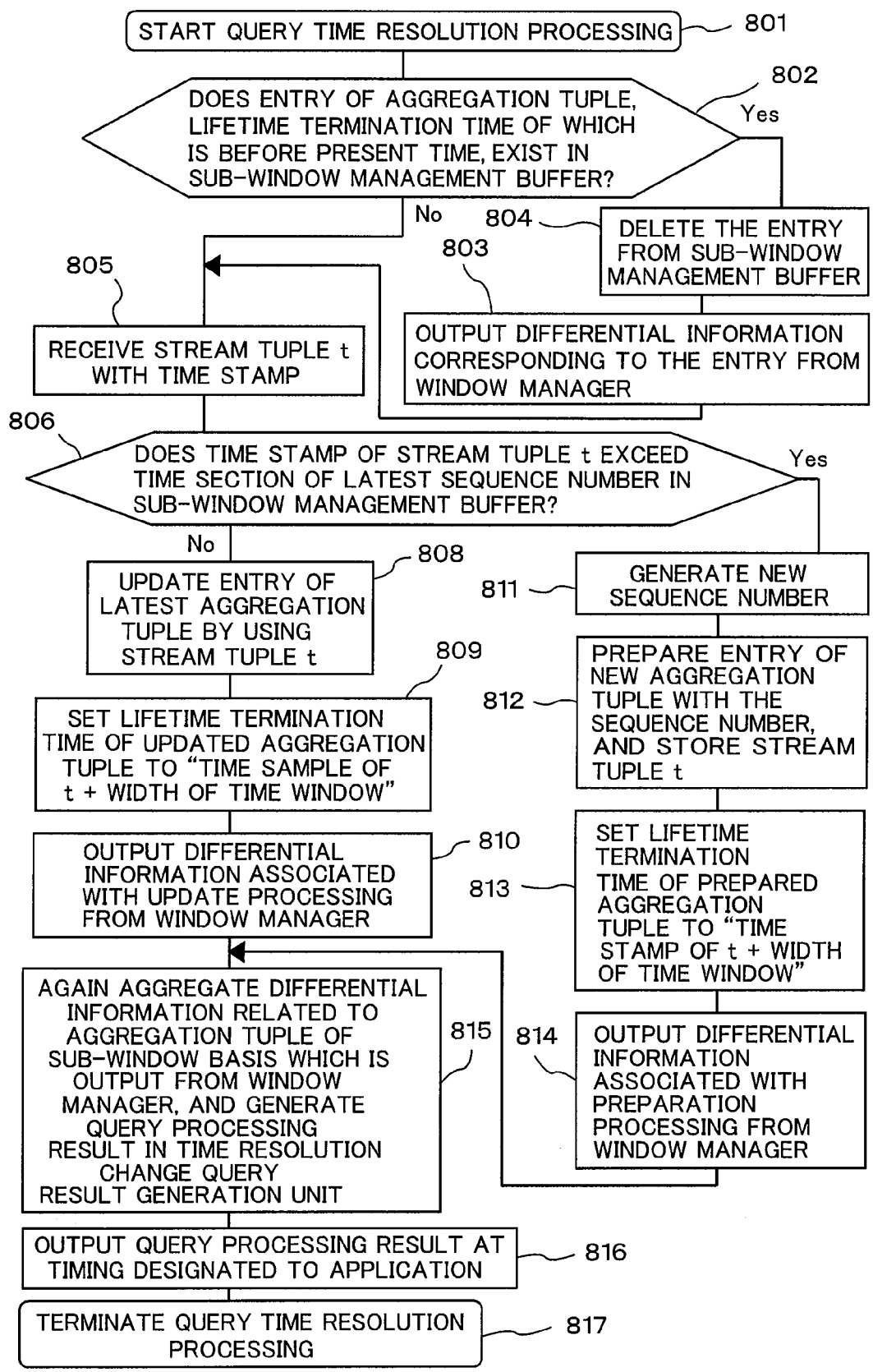
FIG. 8 is a flowchart showing the query time resolution change processing according to the first embodiment.

A flowchart summarizing the above processing is shown in FIG. 8. It is first checked whether the entry of the aggregation tuple, lifetime termination time of which is before the present time, exists in the sub-window information management buffer 143, or not (802). When there is no entry of the aggregation tuple (when No is selected in Step 802), processing is advanced to a subsequent step. This corresponds to a case other than time 10:02:11 in an example shown in FIG. 9. When there is the entry of the aggregation tuple (when Yes is selected in Step 802), the entry is deleted from the sub-window information management buffer 143 (804), and the differential information (stream tuple with a symbol of minus) corresponding to the entry is output from the window manager (803). This processing corresponds to deletion processing for the aggregation tuple entry of the sequence number 10281 at time 10:02:11 in the example shown in FIG. 9.

Then, processing when receiving the stream tuple will be described. For convenience of description, it is assumed that the received stream tuple is t. When the window manager 141 receives the stream tuple t with a time stamp (805), the sub-window management unit 142 checks whether the time stamp of t exceeds the time section of the latest sequence number in the sub-window information management buffer 143, or not (806). If not exceeding the time section (when No is selected in Step 806), the aggregation tuple with the latest sequence number is updated by the aid of the stream tuple t (808), the lifetime termination time of the updated aggregation tuple is set to "time stamp of t+width of time-based window" (809), and the differential information followed by the update processing is output from the window manager 141 (810). This processing in the example of FIG. 9 corresponds to processing when the stream tuples 908, 911, 924, and 927 come.

When the time stamp of t exceeds the time section of the latest sequence number in the sub-window information management buffer 143 (when Yes is selected in Step 806), the sub-window management unit 142 generates new sequence number (811), and produces an entry of a new aggregation tuple having the sequence number within the sub-window information management buffer 143 to store the stream tuple t in the entry (812). The sub-window management unit 142 then sets the lifetime termination time of the produced aggregation tuple to "time stamp of t+width of time-based window" (813), and outputs differential information followed by the production of the aggregation tuple from the window manager (814). This processing in the example of FIG. 9 corresponds to processing when the stream duples 915 and 919 come.

The time resolution change query result generation unit 144 again aggregates the differential information on the aggregation tuple based on the sub-window output from the window manager 141, and generates the query processing result (815). In the re-aggregation processing, a preferred embodiment of the combination of the aggregation specified by the query, the aggregation based on the sub-window (aggregation tuple generating method), and the aggregation processing of the time resolution change query result generation unit 144 is shown in Table 1201 of FIG. 12. This processing in the example of FIG. 9 corresponds to stream tuple calculation on the vertical line 933. In the case of this embodiment, since the aggregation designated by the query is SUM (summation), as shown in Table 1201 of FIG. 12, the sub-window management unit 142 calculates the summation of the coming stream tuple on the sub-window basis, and the time resolution change query result 144 generation unit also calculates the summation of the differential information output from the window manager 141. Returning to FIG. 8, the query processing result generated in the time resolution change query result generation unit 144 is output to the application in timing designated by the query (816). This processing corresponds to the output processing of 907, 914, 918, and 930 in the example of FIG. 9.

In the above-described embodiment, only a case in which the SUM (summation) of Q1 is calculated as the subject query is described with reference to FIGS. 8 and 9. Similarly, the present invention can be applied to a query Q2 (1001) including MAX (maximum value), a query Q3 (1002) including MIN (minimum value), a query Q4 (1003) including COUNT (count), and a query Q5 (1004) including AVERAGE (average value) shown in FIG. 10.

A specific calculating method will be described with reference to Table 1201 of FIG. 12. In FIG. 12, the aggregation tuple of an i-th sub-window is represented as "TAi" (because two kinds of aggregation tuples are used only in the case of #5, TAi_1, and TAi_2 are used). In this case, in Q2, as shown by #2 in FIG. 12, MAX (maximum value) among the aggregation tuples may be calculated in the time resolution change query result generation unit 144 after the aggregation tuple calculating MAX (maximum value) based on the sub-window has been generated in the sub-window management unit 142.

Likewise, in the case of Q3, as shown by #3 in FIG. 12, MIN (minimum value) among the aggregation tuples may be calculated after the aggregation tuple calculating MIN (minimum value) based on the sub-window has been generated. In the case of Q4, as shown by #4 in FIG. 12, SUM (summation) of the aggregation tuples may be calculated after the aggregation tuple calculating COUNT (count) based on the sub-window has been generated. In the case of SUM, MIN, and MAX, operation of the same type as that of operation for calculating the aggregation tuple is used in generation of the final query processing result from the aggregation tuple. However, in the case of COUNT (count) of Q4, even if COUNT of the aggregation tuple based on the sub-window is counted, the number of sub-windows is merely calculated, and therefore attention is necessary.

Finally, in the case of Q5, as shown by #5 of FIG. 12, the summation of the entire aggregation tuples can be divided by the number of entire aggregation tuples to conduct calculation. Further, the stream data processing method according to the present invention can be applied to the calculation of more complicated aggregation values and statistics being the combination of those basic aggregation operations by combining, after the calculation results of the basic aggregation operation have been generated, the calculation results together.

Also, in the above-described embodiment, as the time resolution designation method, an interface that designates all of query name to be changed in time resolution, the input stream name, the sub-window width, the aggregation function, and the column name is shown in FIG. 3. Alternatively, it is possible to execute the time resolution change processing with respect to all of the aggregation functions that can be changed in time resolution by conversion shown in FIG. 12. In this case, the designation of the target aggregation function from the application can be omitted.

Further, in the above embodiment, it is assumed that the query is given in the format of CQL, alternatively the stream data processing method according to the present invention can be also applied to a case in which the query is given by other means such as a procedural language or GUI.

What is claimed is:

1. A stream data processing method in a system conducting query processing on stream data, the method comprising:
sectioning, when the query includes a time-based window in which the stream data arriving at the system within a given time interval is to be processed, the time-based window into sub-windows each having a smaller width;
generating at least one aggregation tuple that aggregates the stream data included within the sub-window; and
calculating the query processing result based on the aggregation tuple.

2. The stream data processing method according to claim 1, wherein an aggregation unit of the aggregation tuple is each aggregation group designated by the query.

3. The stream data processing method according to claim 1, wherein the aggregation processing is again executed on the aggregation tuple to calculate the processing result of the query.

4. A stream data processing method in a system conducting query processing on stream data, the method comprising:
sectioning, when the query includes a time-based window in which stream data arriving at the system within a given time interval is to be processed, the time-based window into sub-windows each having a smaller width;
generating, when a received stream tuple is sectioned into the new sub-window, an aggregation tuple within the sub-window;
setting a termination time of a lifetime of the aggregation tuple to a time obtained by adding a width of the time-based window designated by the query to a time stamp of the received stream tuple;
updating the aggregation tuple based on the stream tuple when the received stream tuple is sectioned into the existing sub-window;
setting the lifetime termination time of the updated aggregation tuple to a time obtained by adding a width of the time-based window designated by the query to the time stamp of the received stream tuple;
generating a stream tuple with a flag that erases the aggregation tuple at the set lifetime termination time; and
calculating the query processing result based on the aggregation tuple.

5. The stream data processing method according to claim 4, wherein an aggregation unit of the aggregation tuple is each aggregation group designated by the query.

6. The stream data processing method according to claim 4, wherein the aggregation processing is again executed on the aggregation tuple to calculate the processing result of the query.

7. A stream data processing system for conducting query processing on stream data, comprising:
a network interface unit that receives the stream data;
a processing unit that conducts query processing on the stream data; and
a storage unit that retains the query, wherein the processing unit sections, when the query includes a time-based window in which the stream data arriving at the system within a given time interval is to be processed, the time-based window into sub-windows each having a smaller width, generates at least one aggregation tuple that aggregates the stream data included within the sub-window, and calculates a processing result of the query based on the aggregation tuple.

8. The stream data processing system according to claim 7, wherein an aggregation unit of the aggregation tuple in the processing unit is each aggregation group designated by the query.

9. The stream data processing system according to claim 7, wherein the processing unit again executes the aggregation processing on the aggregation tuple, which is an aggregation result in the sub-window, to calculate the query processing result.

10. The stream data processing system according to claim 7, wherein the processing unit generates, when a received stream tuple is sectioned into a new sub-window, the aggregation tuple within the sub-window;
sets a termination time of a lifetime of the aggregation tuple to a time obtained by adding a width of the time-based window designated by the query to a time stamp of the received stream tuple;
updates the aggregation tuple based on the stream tuple when the received stream tuple is sectioned into the existing sub-window; sets the lifetime termination time of the updated aggregation tuple to a time obtained by adding a width of the time-based window designated by the query to the time stamp of the received stream tuple; and
generates a stream tuple with a flag that erases the aggregation tuple at the set lifetime termination time.

11. The stream data processing system according to claim 10, wherein an aggregation unit of the aggregation tuple in the processing unit is each aggregation group designated by the query.

12. The stream data processing system according to claim 10, wherein the processing unit again executes the aggregation processing on the aggregation tuple, which is an aggregation result in the sub-window, to calculate the query processing result.

13. The stream data processing system according to claim 7, wherein the processing unit determines possibility for changing the time resolution for determining whether the time-based window can be sectioned into the sub-windows, or not when the query registration processing starts.

14. The stream data processing system according to claim 13, wherein the processing unit determinates possibility for changing the time resolution by determining whether the query processing result is configured by an aggregation function, or not.

15. The stream data processing system according to claim 14, wherein the aggregation function is any one of a summation, a maximum value, a minimum value, a count, and an average value.

* * * * *